(12) United States Patent
Maciej et al.

(10) Patent No.: US 11,970,097 B2
(45) Date of Patent: Apr. 30, 2024

(54) VEHICLE SEAT WITH A CRASH-MODIFIED PANEL HOLDER WITH A PRIMARY FRAME AND AN AUXILIARY FRAME

(71) Applicant: VOLKSWAGEN AKTIENGESELLSCHAFT, Wolfsburg (DE)

(72) Inventors: Steffen Maciej, Magdeburg (DE); Marcel Reps, Haldensleben (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 56 days.

(21) Appl. No.: 17/679,056

(22) Filed: Feb. 23, 2022

(65) Prior Publication Data

US 2022/0266731 A1  Aug. 25, 2022

(30) Foreign Application Priority Data

Feb. 23, 2021  (DE) ..................... 10 2021 201 696.0

(51) Int. Cl.
*B60N 2/68* (2006.01)
*B60N 2/427* (2006.01)

(52) U.S. Cl.
CPC ......... *B60N 2/42709* (2013.01); *B60N 2/682* (2013.01); *B60N 2/686* (2013.01); *B60N 2/688* (2013.01)

(58) Field of Classification Search
CPC ... B60N 2/42709; B60N 2/686; B60N 2/4235
See application file for complete search history.

(56) References Cited

U.S. PATENT DOCUMENTS

| | | | |
|---|---|---|---|
| 5,468,044 A | 11/1995 | Coman | |
| 5,829,831 A | 11/1998 | Sharman | |
| 6,554,356 B1 | 4/2003 | Crose | |
| 7,823,970 B2 | 11/2010 | Okuda et al. | |
| 9,669,741 B2 | 6/2017 | Kramer | |
| 9,701,226 B2 | 7/2017 | Maciej et al. | |
| 10,421,377 B2 | 9/2019 | Tobata et al. | |
| 10,814,759 B2 | 10/2020 | Zalzala et al. | |
| 2016/0009200 A1 | 1/2016 | Katoh et al. | |
| 2018/0281643 A1* | 10/2018 | Umezawa | B60N 2/22 |

(Continued)

FOREIGN PATENT DOCUMENTS

| CN | 101376348 A | 3/2009 |
|---|---|---|
| CN | 105253041 A | 1/2016 |

(Continued)

OTHER PUBLICATIONS

Chinese Office Action dated Jan. 26, 2024 in corresponding application 202210165371.

*Primary Examiner* — Timothy J Brindley
(74) *Attorney, Agent, or Firm* — Muncy, Geissler, Olds & Lowe, P.C.

(57) ABSTRACT

A vehicle seat having a panel arranged as a trim part on a structure of the vehicle seat by means of a panel holder so as to be fixed to the seat structure. Provision is made that the panel holder includes, in addition to a primary frame, a crash-modified auxiliary frame, which frames are made of formed wires, wherein the auxiliary frame, in the assembled state of the panel holder and the panel, is arranged in a critical region of the panel where a high crash force acts on the panel in the event of a crash.

11 Claims, 2 Drawing Sheets

(56) References Cited

U.S. PATENT DOCUMENTS

2019/0106028 A1     4/2019   Kitagawa
2020/0031260 A1 *   1/2020   Zalzala ................. B60N 2/682

FOREIGN PATENT DOCUMENTS

| | | | | |
|---|---|---|---|---|
| CN | 107428272 | A | 12/2017 | |
| CN | 114906028 | A * | 8/2022 | |
| DE | 69600668 | T2 | 3/1999 | |
| DE | 102004043433 | | 3/2006 | |
| DE | 202013104333 | U1 * | 2/2015 | ............ B60N 2/682 |
| DE | 102014012011 | A1 | 3/2015 | |
| DE | 102014219978 | A1 | 4/2016 | |
| DE | 102015205231 | A1 | 9/2016 | |
| DE | 102015215148 | A1 * | 2/2017 | |
| DE | 102019120025 | A1 | 1/2020 | |
| EP | 1612093 | A1 | 1/2006 | |
| EP | 1990235 | A1 * | 11/2008 | ........... B60N 2/4885 |
| FR | 2837158 | A1 | 9/2003 | |
| JP | 2002225610 | A * | 8/2002 | ............... B60N 2/68 |
| JP | 2019010903 | A | 1/2019 | |
| WO | WO2019207221 | | 10/2019 | |

* cited by examiner

VEHICLE SEAT WITH A CRASH-MODIFIED PANEL HOLDER WITH A PRIMARY FRAME AND AN AUXILIARY FRAME

This nonprovisional application claims priority under 35 U.S.C. § 119(a) to German Patent Application No. 10 2021 201 696.0, which was filed in Germany on Feb. 23, 2021, and which is herein incorporated by reference.

BACKGROUND OF THE INVENTION

Field of the Invention

The present invention relates to a vehicle seat with a panel holder.

Description of the Background Art

It is known from the prior art to provide covers or panels that are fastened to a structure or to a seat adjuster by means of mounting elements.

Such mounting elements are also referred to as panel holders or seat panel holders. These panel holders are usually wire frames formed into complex shapes, which are connected on the one hand to the seat structure of a vehicle seat and on the other hand to the panel.

The documents DE 696 00 668 T2 (which corresponds to U.S. Pat. No. 5,829,831), FR 2 837 158 A1, DE 10 2004 043 433 A1, WO 2019 207 221 A1, DE 10 2015 205 231 A1 (which corresponds to US 2016/0280101 and is incorporated herein by reference), DE 10 2014 012 011 A1, and DE 10 2014 219 978 A1 (which corresponds to US 2016/0096452 and is incorporated herein by reference) are referenced as prior art.

The panels are subjected to high forces in the region where a seat belt runs past the panel, for example, in particular is pulled against the panel in the event of a crash. These crash forces jeopardize the structural stability of the panels, especially in the region where the seat belt contacts the panel, especially the lap belt portion of the seat belt. The panels thus have, in the region of action of the forces acting on the panel, a critical region that is subjected to especially high stresses in the event of a crash, especially in the event of a frontal crash. These described problems are resolved, for example according to the document DE 10 2014 219 978 A1, by a panel holder made of at least one wire that has at least one element for fastening the panel holder to a fixed structure adjacent to the panel holder, and at least one element for fastening the panel holder to a panel, wherein the wire forms a support bracket that, in the assembled state of the panel holder and the panel, is arranged in a critical region of the panel where a high crash force acts on the panel in the event of a crash.

The seat panel holders are usually wire/plastic frames formed into complex shapes, which are connected on the one hand to the seat structure of a vehicle seat and on the other hand to the panel, wherein they are only partially supported on the structure, wherein the wire frame disadvantageously does not necessarily support all endangered regions of the panel with regard to an application of force that occurs, in particular in the event of a crash. Moreover, regions of the panel arise that, for example, project prominently in the lateral direction toward the body relative to other regions of the panel in order to accommodate vehicle-seat components within the installation spaces thus formed. If these prominent regions coincide with other components, for example with a lap belt of a seat-belt system acting on the panel from outside, then a region of the panel results that must be especially protected, in particular in the event of a crash. Furthermore, new legal safety requirements of the Euro NCAP now exist for a vehicle seat that specify an increase in the belt pretensioner pull distance from 100 mm to 160 mm as a criterion. As a result, the tensile forces of the belts of the seat-belt system increase, including those of the lap belt, in particular, so that the forces acting on a panel in the event of a crash increase compared with conventional seat-belt systems.

SUMMARY OF THE INVENTION

It is therefore an object of the present invention to provide a panel with a panel holder for a vehicle seat that is optimized with regard to its structural stability by the panel holder, in particular in a critical region.

The starting point of the invention is a vehicle seat having a panel arranged as a trim part on a structure of the vehicle seat by means of a panel holder so as to be fixed to the seat structure.

Provision is made that the panel holder includes a primary frame and an auxiliary frame.

Both frames can be made of wires that are three-dimensionally formed and essentially matched to the inner contour of the panel, wherein the auxiliary frame, in the assembled state of the panel holder and the panel, is arranged in a critical region of the panel where a high crash force acts on the panel in the event of a crash.

The critical region of the panel is created by a seat-belt system of the vehicle seat, in particular a lap belt and/or a belt strap connection composed of the seat-belt buckle and latch plate of the seat-belt system, that is arranged near the panel and that acts on the panel or the panel holder beneath the panel with a high crash force, in particular in the event of a crash.

According to the invention, provision is made that solely the primary frame has at least one structure mounting element by means of which the primary frame is arranged directly on a structure of the vehicle seat in the assembled state of the panel holder and panel, while the auxiliary frame is mounted indirectly on the structure of the vehicle seat, since the auxiliary frame is connected to the primary frame by a type of joint connection.

Provision is made according to the invention that the connection between primary frame and auxiliary frame permits an elastic, oscillating motion of the auxiliary frame parallel to the structure of the vehicle seat.

Provision is made that the auxiliary frame is supported on the structure of the vehicle seat, in particular is supported at certain points. In detail, provision is made in a preferred embodiment that at least one end face of the upper rocker and/or of the lower rocker is supported on the structure of the vehicle seat.

The auxiliary frame includes an upper rocker and a lower rocker. The rockers are joined to one another by connections in order to form the auxiliary frame.

In this design, the upper rocker is arranged and designed to be movable relative to the lower rocker in an elastically oscillating manner through material deformation.

Provision is made that the upper rocker advantageously permits the absorption of a force acting on the panel and on the upper rocker, through an elastic, oscillating motion relative to the lower rocker essentially orthogonal to the vertical plane (x/z plane) of the structure of the vehicle seat, with deformation of the panel and of the upper rocker in the critical region, which is considered an essential aspect of the invention.

It is considered another essential aspect of the invention that the upper rocker is arranged on the inner side of the panel in the critical region of the panel in a specific region of the critical region, which is defined by a prominently protruding edge of the panel, wherein the edge of the panel is supported on the upper rocker, which allows the force acting on the panel and the upper rocker to be absorbed with deformation of the panel and of the upper rocker in the specific critical region.

It is furthermore considered another essential aspect of the invention that the lower rocker is arranged on the inner side of the panel in the critical region of the panel in a specific region of the critical region, which is defined by the panel wall in the vertical plane (x/z plane) of the panel below the prominently protruding edge of the panel, wherein the panel wall of the panel is supported on the lower rocker, which allows the force acting on the panel wall to be absorbed with deformation of the panel wall and of the lower rocker in the critical region.

The invention therefore teaches a panel holder that has the following features:

The panel holder includes the primary frame and the auxiliary frame.

Solely the primary frame has at least one structure mounting element by means of which the primary frame is mounted directly on a structure of the vehicle seat and the auxiliary frame is mounted indirectly on the structure of the vehicle seat in the assembled state, so that the auxiliary frame is connected solely to the primary frame.

The primary frame and the auxiliary frame are joined to one another, in particular welded, by means of a connection in a type of joint connection.

The primary frame preferably includes the upper support bracket and the lower support bracket, which are joined to one another by connections in order to form the primary frame.

The auxiliary frame preferably includes the upper rocker and the lower rocker, which are joined to one another by connections in order to form the auxiliary frame.

The upper rocker is arranged and designed to be movable relative to the lower rocker in an elastically oscillating manner.

For the purpose of this description, a horizontal direction of the panel or of the structure of the vehicle seat is labeled "x". The label "y" designates the direction in the horizontal plane orthogonal to the x-direction, and "z" designates the direction in the vertical plane of the base body orthogonal to the x-direction. The x-direction and the y-direction span a horizontal x/y plane. The x-direction and the z-direction span a vertical x/z plane. The y-direction and the z-direction likewise span a vertical y/z plane, which orthogonally intersects the x/z plane.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
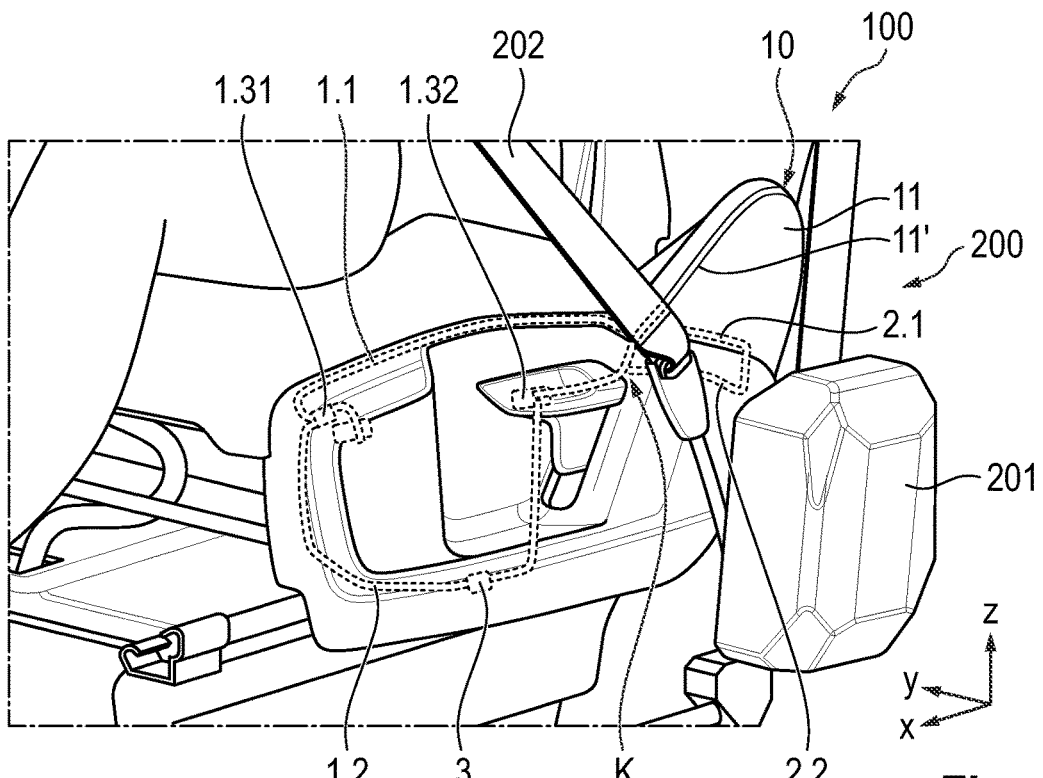
FIG. 1 shows a perspective oblique front view of a detail of a vehicle seat with a panel and a seat-belt system, the lap belt of which exerts a crash force on the panel in a critical region in the event of a crash.

FIG. 1 shows a detail of a vehicle seat 100 in a perspective oblique front view with a panel 10 and with a seat-belt system 200 that is associated with the vehicle seat 100.

The detail of FIG. 1 shows the vehicle seat 100 with the backrest 14 and a seat portion 12 as well as panel 10. Viewed in the longitudinal direction of the panel 10, the panel 10 is arranged to extend in the x-direction (direction of travel) at the side of an adjoining structure 12.1 that is not visible in FIG. 1 (see FIG. 2, in particular) of the seat portion 12.

Thus, a left panel 10 (viewed in the forward travel direction in a vehicle) that is arranged on the seat portion 12 and is in the installed state is shown that is in the assembled state with a panel holder 1, 2. The panel holder 1, 2 is integrated into the panel 10 in the assembled state, wherein the panel holder 1, 2 is connected to the structure 12.1 and the panel 10 is connected to the panel holder 1, 2.

Illustrated in FIG. 1 is that the panel 10 in a critical region where the lap belt region of a lap belt 202 of the seat-belt system 200 may potentially contact the panel 10 in the event of a crash, with the result that the panel 10 must withstand high stresses, since it may potentially be subject to a high application of force. The belt mounting module 201 belonging to the seat-belt system 200 is shown; in the exemplary embodiment, it is arranged such that it is fixed to the vehicle body in the lower region of the B pillar.

In the exemplary embodiment, the force that has an effect on the panel 10 especially in the event of a frontal crash acts on a panel region 11 that projects prominently in the lateral y-direction toward the vehicle body relative to other regions of the panel and that is arranged such that the panel 10 has, in this region between the structure 12.1 of the seat portion 12 and the inner side of the panel 10, installation space in which vehicle-seat components are arranged. On account of this design, the material structure of the panel 10 is even more susceptible to potential material deformation and/or even material destruction with respect to an external application of force.

The panel 10 in the exemplary embodiment also has a recess formed in the y-direction, in which a height adjustment lever (no reference symbol) of the vehicle seat 100 projects in the x-direction from a slot-like opening integrated in the panel 10. The opening 18 accordingly points in the x-direction. Located inside the panel 10 in the exemplary embodiment is a mechanism of the height adjustment lever, for which suitable installation space is reserved in the panel 10.

For orientation of the position or for positioning of the panel holder 1, 2 (which will be explained in detail further below), the panel holder 1, 2 integrated in the panel 10 is drawn in dashed lines in FIG. 1, since it is located behind the structure of the panel 10.

In the critical region, the panel 10 has a flat contact region that is located essentially in a vertical x/y plane and that forms a contact surface pair with the flat inner side of the seat-belt buckle of the lap belt 202. In use, the latch plate of the lap belt 202 is inserted into the seat-belt buckle and the lap belt is placed across the pelvis of the seated person, wherein the combination of seat-belt buckle/latch plate and lap belt is routed over an edge 11' of the panel 1, 2, which is formed between the vertical x/z plane of the panel 1, 2 and a horizontal x/y plane of the panel 10. This edge 11' and the adjacent structures or panel regions 11 of the panel 1, 2 constitute the regions that are most strongly disposed with regard to material integrity and are to be protected, and that could be subject to material deformation and/or even material destruction in the event of a crash due to the action of the combination of seat-belt buckle/latch plate and/or lap belt.

The solution according to the invention explained in detail below avoids this material deformation and/or material destruction, even when there is a high application of force to the panel 10 in the critical region discussed. It is ensured that the three-dimensional structure of the panel 10 is equal to the application of force in the event of a crash. Deformation of the panel 10 accompanying a destruction or any cracking of the panel 10 or the like is reliably avoided.

The measures required for this purpose are realized according to the invention by a panel holder 1, 2 that is arranged on the panel 10 on the inner side of the panel 10 that is not visible in the assembled state, and is arranged on the structure 12.1 of the seat portion 12 of the vehicle seat 100 in the installed state.

The panel holder 1, 2 is composed of a three-dimensionally formed primary (wire) frame and a three-dimensionally formed auxiliary (wire) frame made of a stiff wire. Below, the frames are referred to in short form as primary frame 1 and auxiliary frame 2.

Figure 2:
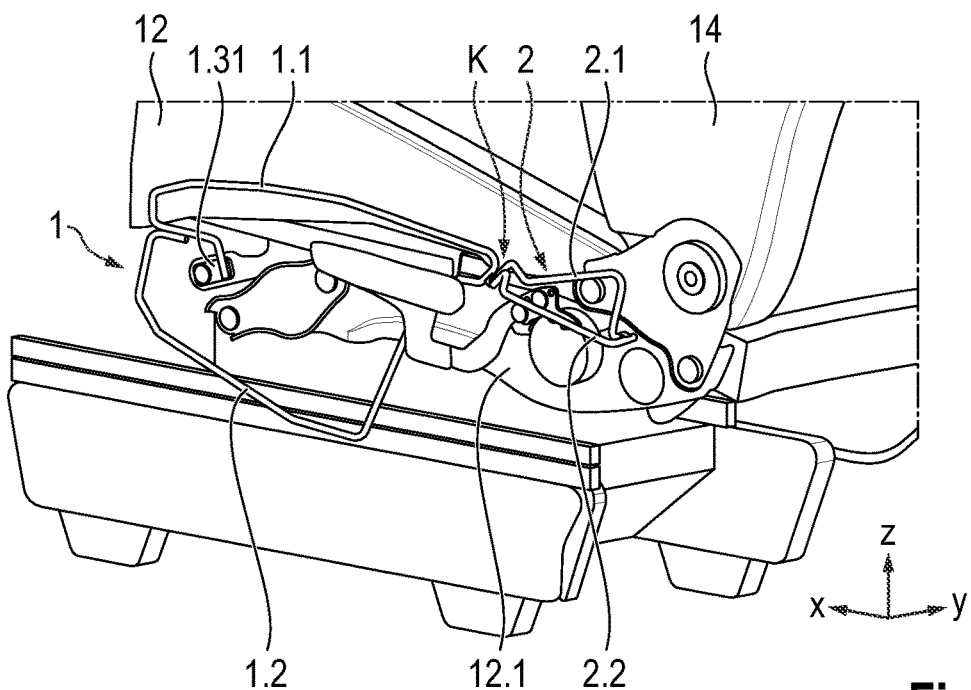
FIG. 2 shows a panel holder according to the invention in a perspective oblique rear view with a primary (wire) frame and an auxiliary (wire) frame.
Figure 3:
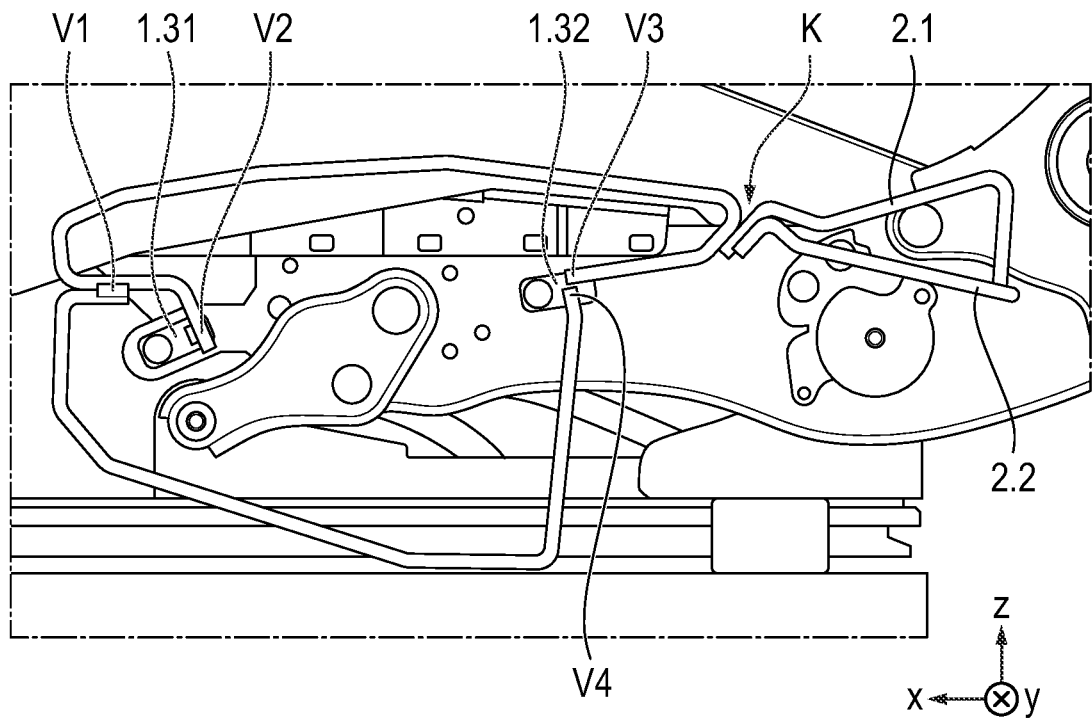
FIG. 3 shows the panel holder according to the invention from FIG. 2, but in a side view and with no adjusting lever.
Figure 4:
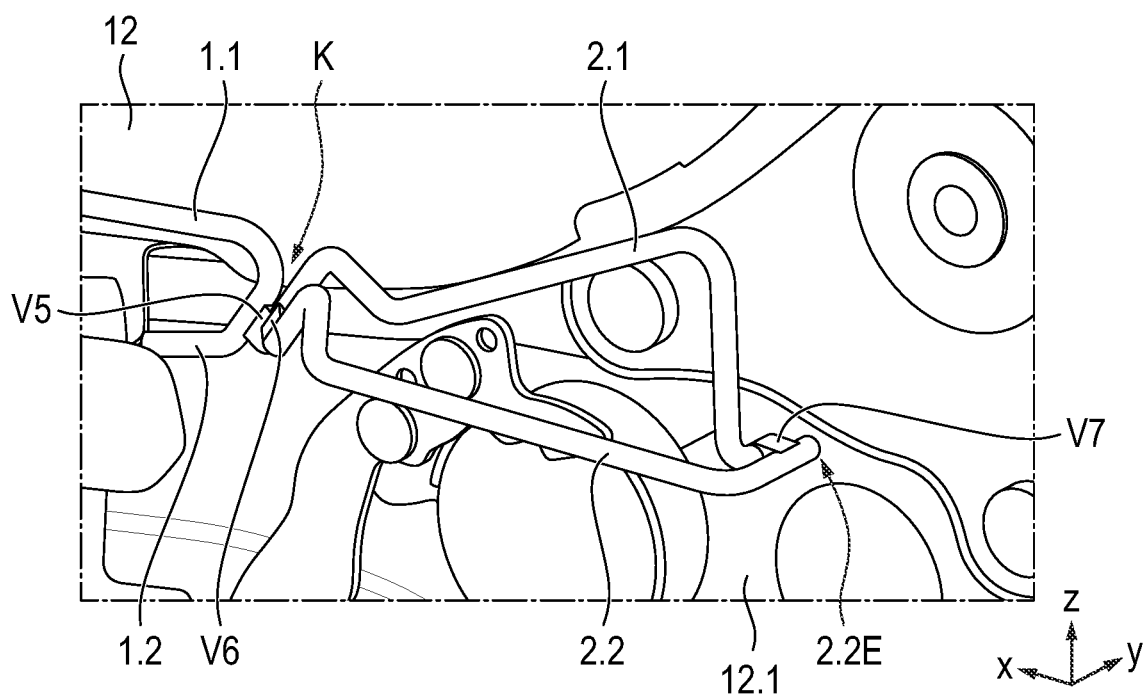
FIG. 4 shows an enlarged perspective oblique rear view of the auxiliary (wire) frame.

For the following description of the primary frame 1, the reader is urged to view FIGS. 1 to 3 as a whole.

For the following description of the auxiliary frame 2, the reader is urged to view FIGS. 1 to 4 as a whole.

The primary frame 1:

The primary frame 1 has an upper support bracket 1.1 and a lower support bracket 1.2.

The end sections of the upper support bracket 1.1 each terminate in the manner of U-shaped brackets.

The main section of the upper support bracket 1.1 is formed between the end sections.

The main section and the end sections of the upper support bracket 1.1 support the upper front region of the panel 10 against forces from the lateral y-direction from outside and from the vertical z-direction from above.

The ends of the end sections designed as U-shaped brackets are each carried on a structure mounting element 1.31 and 1.32 and are permanently connected, in particular welded, thereto in connections V2, V4.

The structure mounting elements 1.31, 1.32 in the manner of mounting plates are connected, in particular screwed, to the structure 12.1 of the seat portion 12.

On one side, the lower support bracket 1.2 has an end section likewise designed as a U-shaped bracket, which extends more vertically (in the z-direction) as compared to the horizontally extending (in the x-direction) end sections of the upper support bracket 1.1.

The end of this end section is ultimately brought, which is to say bent, parallel to the end section of one U-shaped bracket or to the end section thereof, and one end of the lower support bracket 1.2 is permanently connected, in particular welded, to this end section in the connection V1.

On the other side, the lower support bracket 1.2 has an end section that is designed more as an L-shaped bracket, which extends vertically (in the z-direction) as compared to the horizontally extending (in the x-direction) end section of the upper support bracket 1.1.

Formed between the end sections of the lower support bracket 1.2 is the main section of the lower support bracket 1.2, which extends essentially horizontally (in the x-direction).

One end of an end section between the main section of the lower support bracket 1.2 is brought to the U-shaped bracket of the lower support bracket 1.2 and is connected there, in particular welded, to the end section of the lower support bracket 1.2 in the connection V1.

The other end of the lower support bracket 1.2 is permanently connected, in particular welded, to the structure mounting element 1.32 in a connection V3.

The main section and the end sections of the lower support bracket 1.2 support the front, upper region and the front, lower region of the panel 10 against forces acting in a horizontal longitudinal direction (x-direction) from the front and in a vertical z-direction from above and below, and on the whole against forces that act on the panel 10 in a lateral direction (y-direction).

Consequently, the relevant ends of the upper support bracket 1.1 and of the lower support bracket 1.2 are permanently arranged on the structure mounting element 1.32 by the connections V3, V4.

The other ends of the upper support bracket 1.1 and of the lower support bracket 1.2 are, as explained, first connected to one another at the connection V1 and then only one end of the lower support bracket 1.2 is routed to the connection V2 and is permanently connected there to the structure mounting element 1.31.

The panel additionally has a connecting element 3, in particular a living hinge clip, which is arranged on the inner side of the panel 10. The connecting element 3 is connected, in particular snapped/clipped, to the main section of the lower support bracket 1.2, as is schematically indicated in FIG. 1.

The primary frame 1 is therefore arranged in a fixed position, and in the assembled state of the panel holder 1, 2 and panel 10 supports all front regions of the panel 10 on the structure 12.1 of the seat portion 12 in all spatial directions x, y, z.

The connection K between primary frame 1 and auxiliary frame 1:

According to the invention, the primary frame 1 that is arranged in a fixed position in this way is used as a retaining structure for the auxiliary frame 2 in that the auxiliary frame 2 is connected to the upper support bracket 1.1, in particular to the back end section of the upper support bracket 1.1.

A type of joint connection K is created, wherein a connection V5 between the back end section of the upper support bracket 1.1 and an end of the end section of an upper rocker 2.1 and/or of a lower rocker 2.2 of the auxiliary frame 2 is produced in the joint K.

The auxiliary frame 2:

The auxiliary frame 2 includes the upper rocker 2.1 and a lower rocker 2.2.

The end of the end section of the lower rocker 2.2 of the auxiliary frame 2 is connected to the end of the end section of the upper rocker 2.1 in a connection V6.

The end of the end section of the upper rocker 2.1 is connected to the back end section of the upper support bracket 1.1 in a connection V5.

The connections are designed as welded joints in the exemplary embodiment in a preferred implementation.

It is a matter of course that the ends of the end sections of the rockers 2.1 and 2.2 can also be connected in such a manner that the end of the lower rocker 2.2 is connected to the end of the upper support bracket 1.1, and the end of the upper rocker 2.1 is connected to the end of the lower rocker 2.2.

The designation of the two components 2.1 and 2.2 of the auxiliary frame 2 as rockers is intended to make clear that the auxiliary frame 2 is attached to its base, the joint K, in an elastically oscillating manner as it were, which is to say slightly flexibly, as will be made clear below.

The rockers 2.1, 2.2 are not connected along their course to the structure 12.1 of the seat portion 12.

The rockers 2.1, 2.2 are each routed through a curve, starting from the ends at the junction K, to the back panel region 11 of the panel 10, wherein the upper rocker 2.1 essentially rises slightly toward the back to follow the contour of the panel 10, which rises slightly toward the back.

In other words, on the inner side of the panel 10, a main section of the upper rocker 2.1 runs along the edge 11' that is formed essentially orthogonally between the vertical x/z plane of the panel 1, 2 and the horizontal x/y plane of the panel 10.

A main section of the lower rocker 2.2 runs on the inner side of the panel 10 along the vertical x/z plane of the panel 1, 2 below the upper rocker 2.1, essentially horizontally or inclined slightly downward toward the back. In other words, the main section of the lower rocker 2.2 supports the side wall of the panel 10 located in the vertical x/z plane in the back panel region 11 of the panel 10 from the inside, while the upper rocker 2.1 supports the edge 11' and thus the upper horizontal region (in the x/y plane) of the back panel region 11 of the panel 10.

The end section of the upper rocker 2.1 opposite the joint K is in turn designed as an L-shaped bracket and runs in an L-shape in the vertical direction (z-direction) starting from the main section of the upper rocker 2.1. The end of the end section of the upper rocker 2.1 is finally bent inward toward the structure 12.1 of the seat portion 12.

The end section of the upper rocker 2.1 opposite the joint K is likewise designed as an L-shaped bracket and runs in an L-shape in the horizontal direction (y-direction) starting from the main section of the lower rocker 2.2 inward toward the structure 12.1 of the seat portion 12.

The ends of the end sections of the upper and lower rockers 2.1 and 2.2 thus lie next to and parallel to one another when viewed in the y-direction, and in the exemplary embodiment are permanently connected to one another, in particular welded, in a connection V7.

The face of the end face 2.2E of the lower rocker 2.2 contacts the structure 12.1 of the seat portion 12, but according to the invention does not form a permanent connection there, instead supporting itself in the y-direction on the structure 12.1 of the seat portion 12.

Effects according to the invention:

It is made clear by the detailed explanation that the auxiliary frame 2 achieves the following effects according to the invention, which are explained below.

If a force acts, for example, from the lap belt or the seat-belt buckle/latch plate connection from above in the z-direction through the panel 10 on the auxiliary frame 2 that is located directly behind and is in contact with the panel 10, then an effect is that the auxiliary frame 2 as a whole deflects downward, since it is movably arranged by means of the rockers 2.1, 2.2 that are suspended freely in the manner of a lever in the joint K. The auxiliary frame 2 can deflect slightly downward, causing forces that act on the panel 10 to be transformed into deformation energy for deforming the wires of the auxiliary frame 2 and to be dissipated. The panel 10 itself is protected in this way from material deformation and/or even material destruction.

The end face 2.2E of the lower rocker 2.2 in this case contacts the structure 12.1 of the seat portion 12 and moves downward in a semicircle relative to the structure 12.1 due to the "single point suspension" according to the invention of the auxiliary frame 2 in the junction K as pivot axis. The lower rocker 2.2 can participate in this motion on the inner side because the forces are transmitted from the upper rocker 2.1 through the connections V6, V7 to the lower rocker 2.2 and suitable free space for motion is present inside the panel 10 for the motion of the lower rocker 2.2.

If a force acts, for example, from the lap belt or the seat-belt buckle/latch plate connection laterally in the y-direction through the panel 10 on the auxiliary frame 2 that is located directly behind and is in contact with the panel 10 on the lower rocker 2.2, a supporting of the panels 10 in this panel region 11 is ensured as an additional effect, since the lower rocker 2.2 is supported by its end face 2.2E on the structure 12.1 of the seat portion 12.

The main section of the lower rocker 2.2 can transform the forces that act through the panel 10 on the main section of the lower rocker 2.2 into deformation energy through deformation of the wire of the main section of the lower rocker 2.2 so that the forces are dissipated. The panel 10 itself is protected in this way from material deformation and/or even material destruction.

In the case of high forces, the joint K, which is arranged to be free in the space behind the panel 10, also moves toward the structure 12.1 of the seat portion 12 and, as it were, cushions forces in the region of the attachment of the auxiliary frame 2 to the primary frame 1 by introducing force into the primary frame 1.

If, for example, a force acts from the lap belt or the seat-belt buckle/latch plate connection obliquely from above on the edge 11' of the panel 10, then the above-described effects occur in combination, as it were, since in this case the resultant main force on the edge 11' of the panel 10 is composed of the force vectors that act on the edge 11' in the z-direction and the y-direction.

Also added to this, however, is the effect that is achieved by the arrangement of the main section of the upper rocker 2.1 exactly on the back of the edge 11' of the panel 10.

Between its end on the joint side and the end on the structure side, the main section of the upper rocker 2.1 is freely deflectable—like an elastic rocker—toward the structure 12.1 of the seat portion 12.

If the resultant main force of the lap belt or of the seat-belt buckle/latch plate connection, in particular in the prominent region of the panel 10, acts on the edge 11' of the panel 10, then the force is transmitted substantially through the panel 10 to the main section of the upper rocker 2.1 that is supported on the main section.

The wire of the upper rocker 2.1 is nondestructively deformed together with the panel 10 in an advantageous manner to absorb forces, wherein the upper rocker 2.1 in particular absorbs enough energy through its deformation work that the expected forces can be absorbed.

Briefly summarized, the panel holder 1, 2 is designed such that it can optimally absorb all forces acting on the panel 10 from the different spatial directions x, y, z in the different regions of the panel 10, in particular including the belt forces in the back panel region 11 of the panel 10. The stability of the panel 10 is always ensured and material destruction of the panel 10 is reliably avoided. In particular, the auxiliary frame 2 is geometrically formed such that it conforms to the inner contour of the panel 10 on the one hand and on the other hand can absorb, through deformation energy, forces that act from different directions, by the means that the rockers 2.1 and 2.2 and the intended spatial directions are designed to be movable and deformable or are arranged specifically within the panel 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle seat comprising:
 a panel holder; and
 a panel arranged as a trim part on a seat structure of the vehicle seat via the panel holder so as to be fixed to the seat structure;
 wherein the panel holder comprises a primary frame and an auxiliary frame, which are made of formed wires, and
 wherein the auxiliary frame, in an assembled state of the panel holder and the panel, is arranged in a critical region of the panel where a high crash force acts on the panel in an event of a crash,
 wherein solely the primary frame has at least one structure mounting element via which the primary frame is mounted directly on the seat structure of the vehicle seat in the assembled state of the panel holder and panel, while the auxiliary frame is mounted indirectly on the seat structure of the vehicle seat via the primary frame since the auxiliary frame is connected to the primary frame by a joint connection, and
 wherein the joint connection between the primary frame and the auxiliary frame permits art elastic, oscillating motion of the auxiliary frame parallel to the seat structure of the vehicle seat.

2. The vehicle seat according to claim 1, wherein the critical region of the panel is created by a seat-belt system of the vehicle seat or a lap belt or a belt strap connection composed of a seat-belt buckle and a latch plate of the seat-belt system that is arranged near the panel and that acts on the panel with the high crash force in the event of the crash.

3. The vehicle seat according to claim 1, wherein the auxiliary frame is supported on the seat structure of the vehicle seat.

4. The vehicle seat according to claim 1, wherein the auxiliary frame includes an upper rocker and a lower rocker, which are joined to one another by joint connections in order to form the auxiliary frame, wherein the upper rocker is arranged and designed to be movable relative to the lower rocker in an elastically oscillating manner, wherein the upper rocker permits an absorption of a force acting on the panel and on the upper rocker, through an elastic, oscillating motion relative to the lower rocker essentially orthogonal to the vertical plane of the seat structure of the vehicle seat, with deformation of the panel and of the upper rocker in the critical region.

5. The vehicle seat according to claim 4, wherein at least one end face of the upper rocker and/or of the lower rocker is supported on the seat structure of the vehicle seat.

6. The vehicle seat according to claim 4, wherein the upper rocker is arranged on an inner side of the panel in the critical region of the panel, which is defined by a prominently protruding edge of the panel, wherein the edge of the panel is supported on the upper rocker, which allows the force acting on the panel and the upper rocker to be absorbed with deformation of the panel and of the upper rocker in the critical region.

7. The vehicle seat according to claim 4, wherein the lower rocker is arranged on the inner side of the panel in the critical region of the panel, which is defined by the panel wall in the vertical plane of the panel below the prominently protruding edge of the panel, wherein the panel wall of the panel is supported on the lower rocker, which allows the force acting on the panel wall to be absorbed with deformation of the panel wall and of the lower rocker in the critical region.

8. A vehicle seat panel holder comprising:
 a primary frame; and
 an auxiliary frame,
 wherein solely the primary frame has at least one structure mounting element via which the primary frame is mounted directly on a seat structure of a vehicle seat in an assembled state, while the auxiliary frame is mounted indirectly on the seat structure of the vehicle seat via the primary frame since the auxiliary frame is connected to the primary frame by a joint connection,
 wherein the joint connection between the primary frame and the auxiliary frame permits an elastic, oscillating motion of the auxiliary frame parallel to the seat structure of the vehicle seat, and
 wherein the primary frame includes an upper support bracket and a lower support bracket, which are joined to one another by joint connections in order to form the primary frame.

9. The vehicle seat panel holder according to claim 8, wherein the auxiliary frame is directly connected solely to the primary frame.

10. A vehicle seat panel holder comprising:
 a primary frame; and
 an auxiliary frame,
 wherein solely the primary frame has at least one structure mounting element via which the primary frame is mounted directly on a seat structure of a vehicle seat in an assembled state, while the auxiliary frame is mounted indirectly on the seat structure of the vehicle seat via the primary frame since the auxiliary frame is connected to the primary frame by a joint connection,
 wherein the joint connection between the primary frame and the auxiliary frame permits an elastic, oscillating motion of the auxiliary frame parallel to the seat structure of the vehicle seat, and
 wherein the auxiliary frame includes an upper rocker and a lower rocker, which are joined to one another by joint connections in order to form the auxiliary frame.

11. The vehicle seat panel holder according to claim 10, wherein the upper rocker is arranged and designed to be movable relative to the lower rocker in an elastically oscillating manner.

* * * * *